(12) United States Patent
Broom (10) Patent No.: US 8,452,675 B2
(45) Date of Patent: May 28, 2013

(54) AUTOMATIC RECEIVING, INSPECTION, INVENTORY MANAGEMENT AND REPORTING USING WIRELESS COMMUNICATIONS

(75) Inventor: Doyle E. Broom, Georgetown, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 0 days.

(21) Appl. No.: 12/852,078

(22) Filed: Aug. 6, 2010
(Under 37 CFR 1.47)

(65) Prior Publication Data
US 2012/0035746 A1    Feb. 9, 2012

(51) Int. Cl.
A01K 5/02 (2006.01)
G06F 17/50 (2006.01)
G06F 19/00 (2011.01)
G06Q 30/00 (2012.01)
G06Q 90/00 (2006.01)

(52) U.S. Cl.
USPC ............................. 705/29; 700/107; 235/385

(58) Field of Classification Search
USPC ............... 700/97, 105, 106, 107; 705/22, 28, 705/29; 707/944, 949; 235/385
See application file for complete search history.

(56) References Cited

U.S. PATENT DOCUMENTS

| | | | | |
|---|---|---|---|---|
| 6,138,105 | A * | 10/2000 | Walker et al. | 705/14.41 |
| 7,110,954 | B2 * | 9/2006 | Yung et al. | 705/26.1 |
| 7,694,874 | B2 * | 4/2010 | Narasimhan et al. | 235/375 |
| 7,752,088 | B1 * | 7/2010 | Coschera | 705/28 |
| 8,140,279 | B2 * | 3/2012 | Subbloie | 702/61 |
| 2002/0077850 | A1 * | 6/2002 | McMenimen et al. | 705/2 |
| 2003/0074283 | A1 * | 4/2003 | Lee et al. | 705/28 |
| 2007/0250180 | A1 | 10/2007 | Bump et al. | |
| 2008/0235081 | A1 * | 9/2008 | Davison et al. | 705/10 |
| 2009/0070237 | A1 * | 3/2009 | Lew et al. | 705/28 |
| 2011/0144786 | A1 * | 6/2011 | Pearce | 700/100 |

FOREIGN PATENT DOCUMENTS

| | | |
|---|---|---|
| EP | 1 736 843 A1 | 12/2006 |
| EP | 1 760 642 A2 | 3/2007 |
| GB | 2 403 043 A | 12/2004 |
| GB | 2 422 234 A | 7/2006 |
| JP | 2009295010 A * | 12/2009 |
| WO | WO-2008/030680 A1 | 3/2008 |

OTHER PUBLICATIONS

Search Report for Application No. GB1113566.2, dated Dec. 7, 2011.

\* cited by examiner

*Primary Examiner* — Crystal J Barnes-Bullock
(74) *Attorney, Agent, or Firm* — Marshall, Gerstein & Borun LLP (57) ABSTRACT

A system for managing an inventory of process control devices in a process plant includes a computer workstation, a database storing instrument specification data for one or more process control devices used for controlling a process performed in the process plant environment, a wireless gateway adapted to wirelessly communicate with wireless enabled process control devices in the process plant environment, a communication bus interconnecting the wireless gateway, the computer workstation, and the database, an inventory control application executed by the computer workstation. The inventory control application is adapted to interrogate a received process control device via the wireless gateway to receive device data from the received process control device identifying and describing the received process control device. The inventory control application is further adapted to access the database to retrieve instrument specification data for the received process control device and compare the received device data to the retrieved instrument specification data. The inventory control application ensures that the received process control device corresponds to the instrument specification data.

21 Claims, 5 Drawing Sheets

| | | LEVEL INSTRUMENTS (CAPACITANCE TYPE) | | | | SHEET    OF | | |
|---|---|---|---|---|---|---|---|---|
| | | | | | | SPEC.NO | | REV. |
| | | NO | BY | DATA | REVISION | | | |
| | | | | | | CONTRACT | | DATE |
| | | | | | | | | |
| | | | | | | REQ.   P.O. | | |
| | | | | | | | | |
| | | | | | | BY | CHK'D | APPR. |
| GENERAL | 1 | Tag Number | | | | | | |
| | 2 | Service | | | | | | |
| | 3 | Line No./Vessel No. | | | | | | |
| | 4 | Application | | | | | | |
| | 5 | Function | | | | | | |
| | 6 | Fail-Safe | | | | | | |
| PROBE | 7 | Model Number | | | | | | |
| | 8 | Orientation | | | | | | |
| | 9 | Style | | | | | | |
| | 10 | Material | | | | | | |
| | 11 | Sheath | | | | | | |
| | 12 | Insertion Length | | | | | | |
| | 13 | Inactive Length | | | | | | |
| | 14 | Gland Size & Mat'l. | | | | | | |
| | 15 | | | | | | | |
| | 16 | Conduit Connection | | | | | | |
| AMPLIFIER | 17 | Location | | | | | | |
| | 18 | Enclosure | | | | | | |
| | 19 | Conduit Connection | | | | | | |
| | 20 | Power Supply | | | | | | |
| SWITCH | 21 | Type | | | | | | |
| | 22 | Quantity and Form | | | | | | |
| | 23 | Rating: Volts/Hz or dc | | | | | | |
| | 24 | Amps/Watts/HP | | | | | | |
| | 25 | Load Type | | | | | | |
| | 26 | Contacts Open\| On \|Incr. | | | | | | |
| | 27 | Close \|Level\|Decr. | | | | | | |
| TRANS. | 28 | Output | | | | | | |
| | 29 | Range | | | | | | |
| | 30 | Enclosure Class | | | | | | |
| OPTIONS | 31 | Compensation Cable | | | | | | |
| | 32 | Local Indicator | | | | | | |
| | 33 | I/P Transducer | | | | | | |
| | 34 | Signal Lights | | | | | | |
| | 35 | | | | | | | |
| SERVICE | 36 | Upper Fluid | | | | | | |
| | 37 | Dielectric Constant | | | | | | |
| | 38 | Lower Fluid | | | | | | |
| | 39 | Dielectric Constant | | | | | | |
| | 40 | Pressure Max.\| Normal | | | | | | |
| | 41 | Temp.   Max. \| Normal | | | | | | |
| | 42 | Moisture | | | | | | |
| | 43 | Material Buildup | | | | | | |
| | 44 | Vibration | | | | | | |
| | 45 | Manufacturer | | | | | | |
| | 46 | Model Number | | | | | | |

Notes:

AUTOMATIC RECEIVING, INSPECTION, INVENTORY MANAGEMENT AND REPORTING USING WIRELESS COMMUNICATIONS

FIELD OF THE INVENTION

The present disclosure relates to managing an inventory of process control devices in a processing plant environment. More particularly, the disclosure relates to systems and methods for receiving process control devices or other equipment at a processing plant, wirelessly inspecting the received process control devices or other equipment, reconciling discrepancies between received devices or other equipment and the instrument specification defining the received devices or other equipment, and otherwise managing an inventory of process control devices and other process-related equipment.

BACKGROUND

Process control systems, like those used in chemical, petroleum or other processes, typically include a centralized process controller communicatively coupled to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, uses this information to implement a control routine and then generates control signals which are sent over the buses to the field devices to control the operation of the process. Information from the field devices and the controller is typically made available to one or more applications executed by the operator workstation to enable an operator to perform any desired function with respect to the process, such as viewing the current state of the process, modifying the operation of the process, etc.

In the past, conventional field devices were used to send and receive analog (e.g., 4 to 20 milliamp) signals to and from the process controller via an analog bus or analog lines. These 4 to 20 ma signals were limited in nature in that they were indicative of measurements made by the device or of control signals generated by the controller required to control the operation of the device. However, in the past decade or so, smart field devices including a microprocessor and a memory have become prevalent in the process control industry. In addition to performing a primary function within the process, smart field devices store data pertaining to the device, communicate with the controller and/or other devices in a digital or combined digital and analog format, and perform secondary tasks such as self-calibration, identification, diagnostics, etc. A number of standard and open smart device communication protocols such as the HART®, PROFIBUS®, WORLDFIP®, Device-Net®, and CAN protocols, have been developed to enable smart field devices made by different manufacturers to be used together within the same process control network. More recently smart field devices have been equipped with wireless transceivers, allowing the smart field devices to communicate wirelessly with process controllers and applications executed on various operator workstations within the process plant environment. Various wireless communication protocols, such as the HART wireless communication protocol, have been developed to facilitate wireless communications between wireless enabled process control devices or other process control equipment and process controllers, operator workstations, and the like.

Once installed, process control devices are subject to operational wear and tear, and over time may be subject to failure. In order to minimize process downtime resulting from unpredicted device failures, it is desirable to maintain an inventory of spare process control field devices so that when a failure does occur replacement parts are readily available. Managing such an inventory can present a number of challenges. Each field device must be individually identified and must meet certain specifications to ensure that it is capable of performing the specific process control function for which it is intended. An instrumentation department of even a medium-sized processing plant may include between 3,000 and 6,000 field devices. Keeping track of all the field devices in such an environment, monitoring an inventory of spare parts, ordering replacement field devices, and receiving and inspecting received field devices can be a monumental task.

Particularly burdensome is the task of inspecting received field devices and other equipment to ensure that the received devices meet specified requirements. In the past, this has required unpacking each individual process control field device when it is received and physically inspecting the field device to ensure compliance with specified requirements. This can be very time consuming and can be prone to errors if the personnel inspecting the received field devices happen to miss discrepancies between the specified device and the device actually received.

The advent of smart process control field devices has alleviated this problem to a degree. Smart process control field devices may be shipped with specification data stored in the smart process control field device's internal memory. The specification data stored in the device describe the device and how it is configured. The specification data stored in the device memory may include for example, a device tag identifying the device, various operating parameter values describing operating ranges, capacity, sizes, materials of construction, and types of sensors associated with the device as shipped from the supplier. In fact, the data stored in the device memory may include all of the specifications used for ordering the device.

When the smart process control field device is received at the processing plant, receiving personnel may connect the device to an inspection fixture adapted to read the device data from the received device's internal memory. An inventory control application associated with the inspection fixture may have access to a database storing the specification data for the field devices used throughout the process plant environment. The inventory control application may then compare the device data read from the device memory to the specification data stored in the database for the device to ensure that the received smart process control field device was configured and shipped according to the device specifications. While this semi-automated procedure has advantages over a purely manual inspection by plant receiving personnel, it still requires that devices be at least partially unpacked and individually connected to a test fixture. This can be inconvenient and time-consuming, especially when hundreds or thousands of process control field devices are received on a regular basis.

Another difficulty in maintaining an up-to-date inventory of process control field devices is tracking specification changes for individual process control field devices. Over time the specifications for various process control field devices may be altered to improve process performance or for other reasons. Such changes may be the result of design changes, or the introduction of newer devices that provide some improvement in performance or cost savings over the originally specified devices. Such changes must be reflected in the purchase orders issued for the replacement process control field devices whose specifications have changed. Complicating things further is the fact that specifications might be changed after an order has already been placed for a replacement process control device, or even after replacement devices have already been received at the process plant and placed in inventory. In this case, it is undesirable to replace an existing process control device with a spare device that is configured according to outdated specifications.

A final challenge in maintaining an inventory of replacement process control field devices is one of simple accounting. Keeping track of all of the process control field devices in a process plant, including both installed field devices and spare field devices held in inventory, can be complicated and time consuming. Monitoring the inventory is necessary, however, in order to ensure that adequate replacement parts are available so that, if a field device fails or is coming to the end of its expected operational life, the failed or aging field device may be replaced with as little interruption to the controlled process as possible.

SUMMARY

The present disclosure relates to systems and methods for managing an inventory of process control devices within a processing plant environment. According to an embodiment, an inventory control system comprises a computer workstation, a database storing instrument specification data for one or more process control devices used for controlling a process performed in the process plant environment, a wireless gateway adapted to wirelessly communicate with wireless enabled process control devices located within in the process plant environment, and a communication bus interconnecting the wireless gateway, the computer workstation, and the database. An inventory control application is executed by the computer workstation. The inventory control application is adapted to interrogate received process control devices via the wireless gateway in order to receive device data from the received process control devices. The received device data identify and describe the received process control devices. The inventory control application is further adapted to access the database to retrieve instrument specification data for the received process control devices and compare the received device data to the retrieved instrument specification data. By comparing the received device data to the corresponding instrument specification data, the inventory control application ensures that received process control devices meet the instrument specification data.

Another embodiment provides a method of inspecting wireless enabled process control equipment. According to this embodiment the method includes receiving a wireless enabled process control device having device data stored therein. The device data stored in the wireless enabled process control device identifies the device and describes one or more characteristics of the device. The method further includes wirelessly receiving the device data from the wireless enabled process control device. Once the device data identifying the received wireless enabled process control device have been received, the method calls for accessing a database to retrieve specification data corresponding to the received wireless enabled process control device. The method then calls for comparing the specification data to the device data and performing a reconciliation procedure when the specification data do not match the specification.

In yet another embodiment, computer executable instructions are stored on a computer readable medium. When executed by a computer processor, the instructions provide an inventory control system for use in a process plant environment. The inventory control system is adapted to perform the steps of receiving a wireless communication from a received process control device, the wireless communication identifying the process control device and one or more operating parameters or physical characteristics of the process control device, retrieving specification data for the process control device from a data base, and comparing the one or more operating parameters or physical characteristics of the process control device to the specification data. The inventory control system is further adapted to perform one of adding the process control device to an inventory of process control devices when the one or more operating parameters or physical characteristics of the process control device match the specification data, or reconciling the process control device with the specification data if the one or more operating parameters or physical characteristics of the process control device do not match the specification data.

Further aspects and advantages will be apparent to those of ordinary skill in the art from a review of the following detailed description, taken in conjunction with the drawings. While the compositions and methods are susceptible of embodiments in various forms, the description hereafter includes specific embodiments with the understanding that the disclosure is illustrative, and is not intended to limit the invention to the specific embodiments described herein.

DETAILED DESCRIPTION

The present disclosure relates to systems and methods for managing an inventory of various process control field devices and other equipment associated with controlling the operation of a process plant. In particular, systems and methods are provided for receiving wireless enabled field devices or other wireless enabled process control equipment, inspecting the received wireless enabled field devices or other wireless enabled process control equipment to ensure that various operating parameters and physical characteristics of the received wireless enabled field devices or other wireless enabled process control equipment meet the requirements of the process control system into which they are to be installed, reconciling any differences between the operating parameters and physical characteristics of the received wireless enabled field devices or other wireless enabled process control equipment with the specified parameters and operating characteristics of the received wireless enabled field devices or other wireless enabled process control equipment, and tracking the status of the received wireless enabled field devices or other wireless enabled process control equipment throughout the operational life cycle of the received wireless enabled field devices or other wireless enabled process control equipment. (Throughout the remainder of the present disclosure such wireless enabled field devices or other wireless enabled process control equipment will be collectively referred to as "wireless enabled field devices," regardless of whether a particular device or piece of equipment would traditionally be considered a "field device" by those of ordinary skill in the art.)

Figure 1:
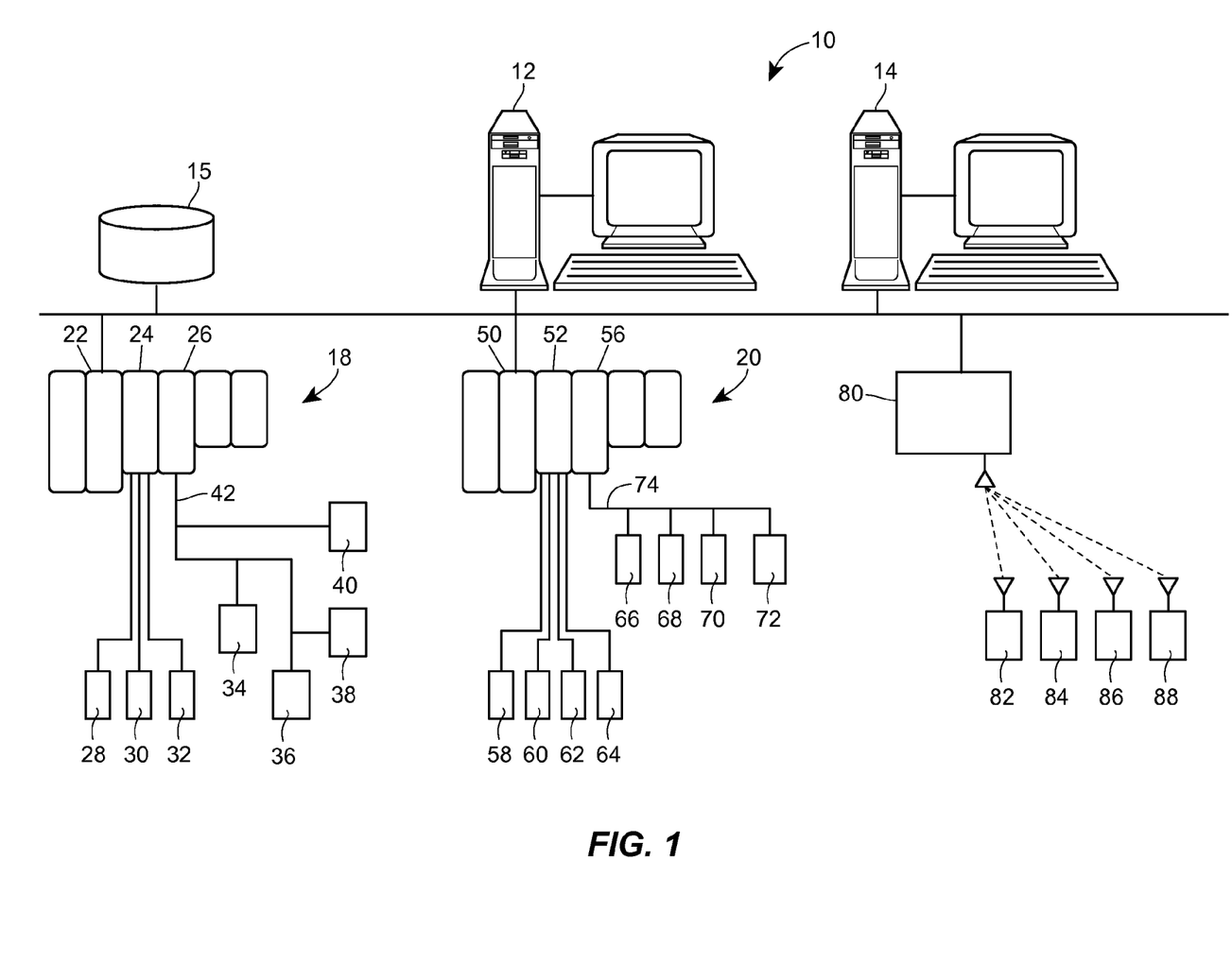
FIG. 1 is an exemplary block diagram of a process plant having a distributed control network including one or more operator workstations, controllers, field devices and supporting equipment.

FIG. 1 shows a portion of a typical distributed process control system 10 that may be implemented to control a process in a process plant environment. The distributed process control system 10 includes one or more process controllers 18, 20. Typically, each controller 18, 20 will include a control processor module 22, 50 and one or more input/output (I/O) devices 24, 26, 52, 56. The I/O devices communicate with one or more field devices 28-40, 58-72. The field devices 28-40, 58-72 may be any type of field device such as, for example, sensors, valves, transmitters, positioners, and so forth. The field devices 28-40, 58-72 may conform to any desired open, proprietary, or other communication or programming protocol. In the process plant 10 the field devices 28-32, 58-64 may be conventional (i.e. non-smart) field devices that communicate directly with I/O devices via a 4-20 mA analog signal. Alternatively, or in addition to the conventional field devices 28-32, 58-64, the field devices 34-40, 66-72 may comprise smart field devices such as, for example FOUNDATION® Fieldbus field devices having their own processors and memories allowing them to perform various local control functions and to communicate with the I/O devices 26, 56 over digital communication busses 42, 74, using, for example, the Hart, Fieldbus, or other communication protocol.

The process control system 10 may further include one or more workstations 12, 14, and a database 15. The database 15 may comprise a configuration database storing configuration data for the process control system, including records of the various field devices installed in the process plant for controlling the controlled process and the various operating parameters and physical characteristics associated with the various field devices. The workstations 12, 14 may be coupled to the process controllers 18, 20 and the database 15 via a communication line or bus 16. The communication line or bus 16 may be implemented using any desired hardwired or wireless communication protocol such as, for example, Ethernet protocol. The workstations 12, 14 may implement various process related applications and provide one or more user interfaces accessible by various plant personnel including configuration engineers, process control operators, maintenance personnel, and so forth. As will be described below, one or more of the workstations 12, 14 may implement an inventory control application for receiving and tracking the status of field devices received from suppliers. According to an embodiment the inventory control system may be adapted to electronically interrogate the received field devices to obtain data about the devices and how they are configured to ensure that they meet specified criteria stored in the configuration database 15.

The process control system 10 may also include one or more wireless gateways 80 and a plurality of wireless enabled field devices 82-88. The wireless gateway 80 and the wireless field devices 82-88 may comprise individual nodes in a self organizing wireless field network implemented within the process plant. According to such a network, field devices may be equipped with wireless transceivers adapted to communicate using the HART wireless protocol. For example, each transceiver equipped field device acts as a communication node within a self-configuring network. The transceivers associated with the various field devices 82-88 allow the field devices to wirelessly transmit and receive data. The system is a self organizing network in that, in addition to transmitting and receiving their own messages, the individual nodes within the network act as repeaters, receiving and retransmitting communications received from other nodes in the network. Thus, a first node within the self-organizing network may transmit a wireless communication directed toward the gateway 80. The gateway 80, however, may be located beyond the transmitting range of the transceiver of the first network node. A second node in the self-organizing network located somewhere between the first node and the gateway 80 may receive the wireless communication from the first node and rebroadcast the wireless communication to all of the network nodes that are within the second node's transmitting range. If the gateway 80 is within the transmitting range of this second node, it will receive the rebroadcast wireless communication from the second node and the wireless communication originating at the first node will have reached its destination. Otherwise, the wireless communication rebroadcast from the second node may be received and rebroadcast by a third node, and a fourth node, and so forth, until it reaches its intended destination. Prior to repeating a wireless communication, however, nodes acting as repeaters may check to ensure that they have not previously transmitted the same message. This ensures that the nodes do not repeat messages they have already forwarded across the network, and which have been echoed back to them by still other nodes repeating the same message. In this way wireless communications are quickly and efficiently propagated across the network. Such a self organizing network provides a robust communication system in which there may be multiple transmission paths between various points in the network to ensure that wireless transmissions reach their intended destinations.

The wireless gateway 80 may be adapted to communicate with other components of the process control system such as the controllers 18, 20 and the work stations 12, 14 over the communication bus 16. Thus, data transmitted by the various wireless enabled field devices 82-88 may be accessible to control programs executed by the controllers 18, 20, as well as applications implemented on the workstations 12, 14. Data received from the wireless enabled field devices may be stored in the database 15, or some other data repository, such as a data historian, data warehouse, or the like.

Figure 2:
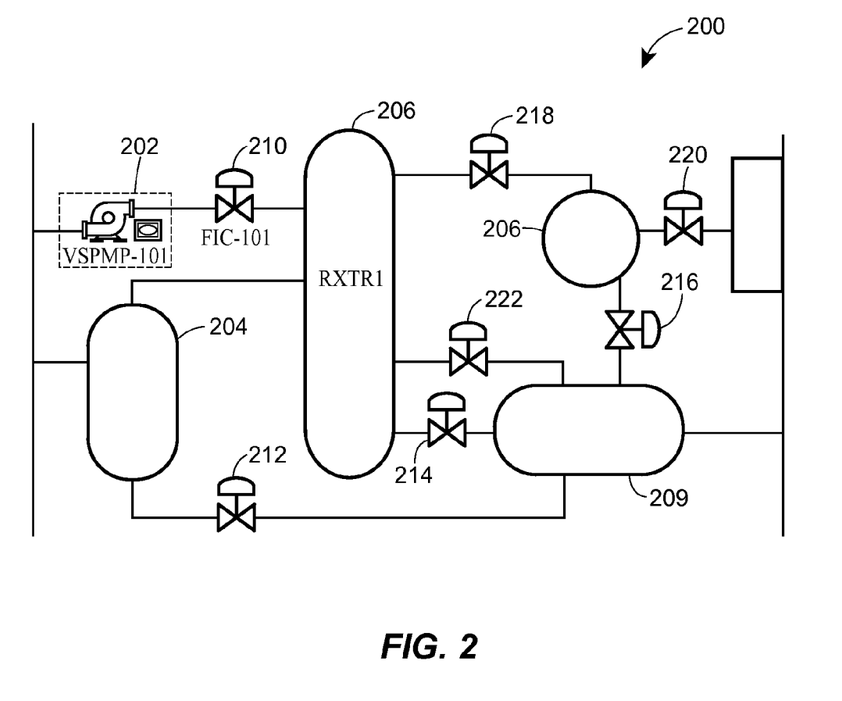
FIG. 2 is a portion of a typical configuration diagram showing the configuration of a portion of a controlled process.

Each field device within a process control system performs a unique function with respect to a controlled process. Thus, each field device must be individually identified by a unique device tag, or some other identifier that distinguishes it from every other field device installed in the process control system. FIG. 2. for example, is a configuration diagram 200 of a portion of a controlled process. The configuration diagram 200 shows a number of different field devices and other equipment such as a pump 202, holding and mixing tanks 204, 206, 208 and a number of process control valves 210-222.

Individual field devices, even those of the same general type, may be required to operate under vastly different conditions. For example, while the two valves 212, 216 are both flow control valves, they may be located in different parts of the process and must be capable of handling very different fluids. For example, the flow control valve 210 controlling the flow of fluid from the holding tank 204 to the mixing tank 208 may control the flow of water or some other benign fluid, whereas the valve 216 controlling the flow of fluid from tank 206 into mixing tank 208 may control the flow of some very corrosive liquid. Thus, the valve 216 must be made of more expensive corrosion-resistant materials, whereas the valve 212 may be made of less expensive standard materials.

Most process plant environments include many hundreds or thousands of field devices. Capacity, flow rates and materials of construction are but examples of the multitude of different operating parameters and physical characteristics that must be specified for each individual process control field device in a process plant environment. Keeping track of the specifications for the various field devices installed in a large processing plant, monitoring spare parts and ensuring that replacement parts meet specified requirements is a monumental task. This task is often complicated by the fact that specifications may be altered over time based on practical experience, design changes, or altered operating conditions. In these cases, replacement field devices must meet the new altered requirements rather than those originally called for when the process control system was first designed and implemented. Furthermore, inventory control problems can arise when the specifications for a particular field device are altered after an order for a replacement device has already been placed with a supplier, or after a replacement device has been received and placed in inventory awaiting installation should the original field device fail or otherwise need replacement. In short, ensuring that replacement field devices meet the most up-to-date specifications before they are installed in a process control system is a significant challenge for operators, maintenance personnel, shipping and receiving personnel, purchasing personnel, and suppliers alike.

According to an embodiment of a field device inventory control system for use in a process plant environment, the primary tool for managing the specified parameters and characteristics of the various field devices installed in the process plant is an Instrument Specification Sheet. The Instrument Specification Sheet is a form (electronic or otherwise) that lists all of the parameters and physical characteristics of a field device installed in a controlled process. Preferably, an individual Instrument Specification Sheet is created for every field device included in the control system when the process control system is designed. New Instrument Specification Sheets may be created when new field devices are added to the process control system, or when the specifications for existing field devices are changed.

Figure 3:
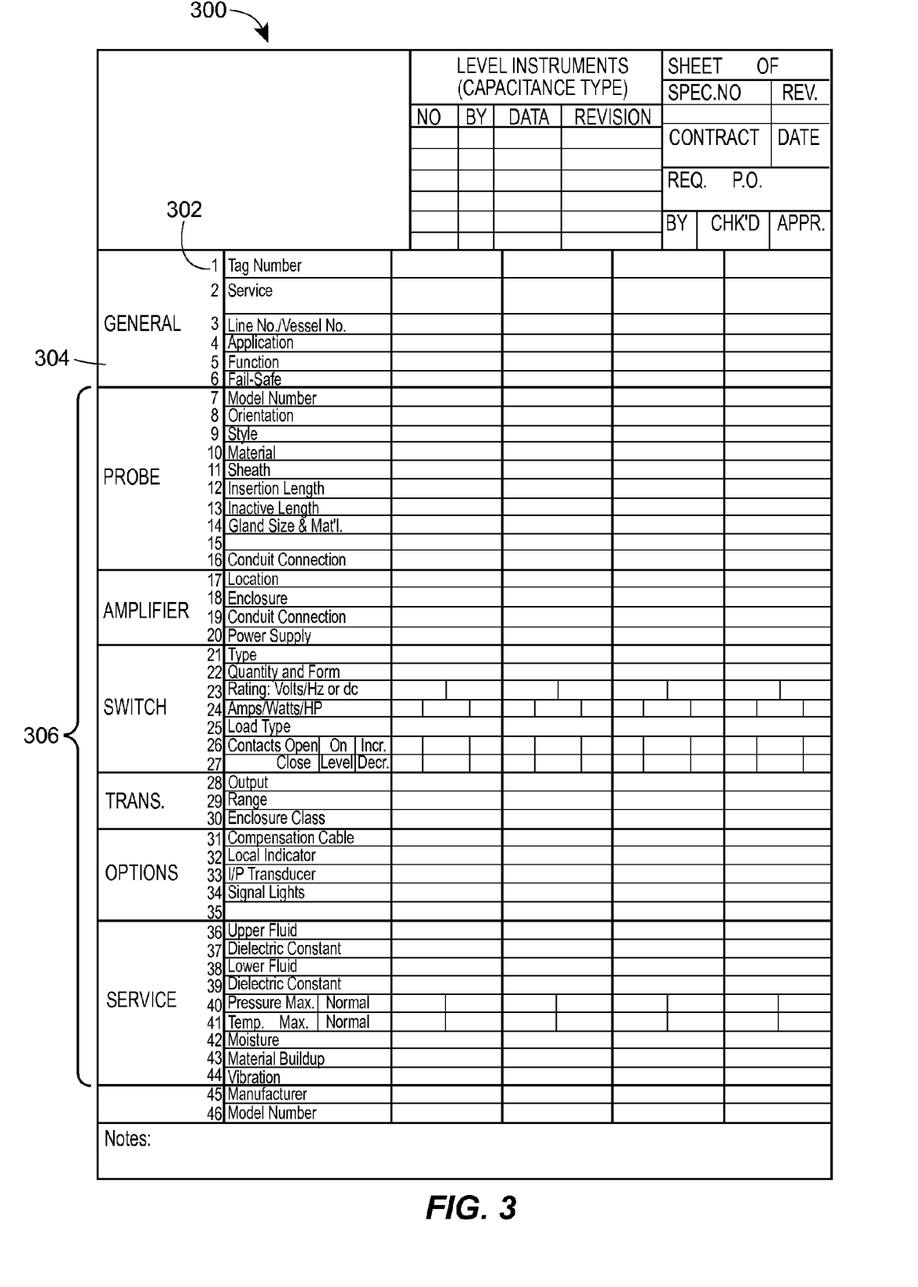
FIG. 3 is an example of an Instrument Specification Sheet.

FIG. 3 shows an example of an Instrument Specification Sheet 300. The Instrument Specification Sheet 300 includes a device tag 302 identifying the particular field device, a description of the field device 304, and a number of parameters 306 describing the configuration and physical characteristics of the field device. The parameters listed in the Instrument Specification Sheet may include "soft parameters" (those parameters that may be altered by merely changing a parameter value stored in a parameter memory associated with the field device or otherwise altering software stored in the smart field device's memory) or "hard parameters" (relating to physical aspects of the field device that cannot be altered, or which can only be altered by physically reconfiguring the field device).

The Instrument Specification Sheets for the various field devices employed in a process plant may be stored in a database, such as the configuration database 15 shown in FIG. 1, or some other database. As mentioned above, the configuration database 15 is accessible via the communication bus 16. Thus, applications running in the workstations 12, 14 may access the Instrument Specification Sheets stored in the database 15 to retrieve information about the various field devices installed in the controlled process. In some cases applications running in the workstations 12, 14 may actually be allowed to alter the parameters stored in various field device Instrument Specification Sheets or add new field device Instrument Specification Sheets to the database when changes have been made to the process control system.

One such application executed by a network workstation 12, 14 connected to the communication bus 16 may comprise a field device inventory control application. According to an embodiment, a field device inventory control application may be used to inspect process control devices as they are received from suppliers. Device tags, parameter values, physical characteristics, and other data typically found in a field device's Instrument Specification Sheet may be stored in a memory associated with each received field device. As will be described in more detail below, the field device inventory control system may be adapted to wirelessly interrogate field devices as they are received into the process plant environment. As part of the interrogation process, a processor associated with each field device may be adapted to wirelessly communicate the devices tag, parameter values, and other device data stored in the field device's internal memory to the field device inventory control application. The field device inventory control application identifies the received field device from the received device tag and accesses the database 15 to retrieve the corresponding Instrument Specification Sheet for the received field device. The Instrument Specification Sheet stored in the database 15 represents the current most up-to-date specifications for the received device. The field device inventory control application may compare the various parameters and physical design characteristics of the specified field device to the parameter values and physical design characteristics of the received field device communicated from the received field device to the inventory control application. When discrepancies are found between the specified values in the field device Instrument Specification Sheet and the values read directly from the received field device, the inventory control application may invoke a reconciliation procedure to re-configure the received field device, if possible. The reconciliation process may range from altering the soft parameters stored in the field device, to outright rejection of the received field device if the discrepancies cannot be reconciled. Rejected field devices may be sent back to the supplier to be replaced by field devices that meet the requirements spelled out in the current Instrument Specification Sheet stored in the database.

Figure 4:
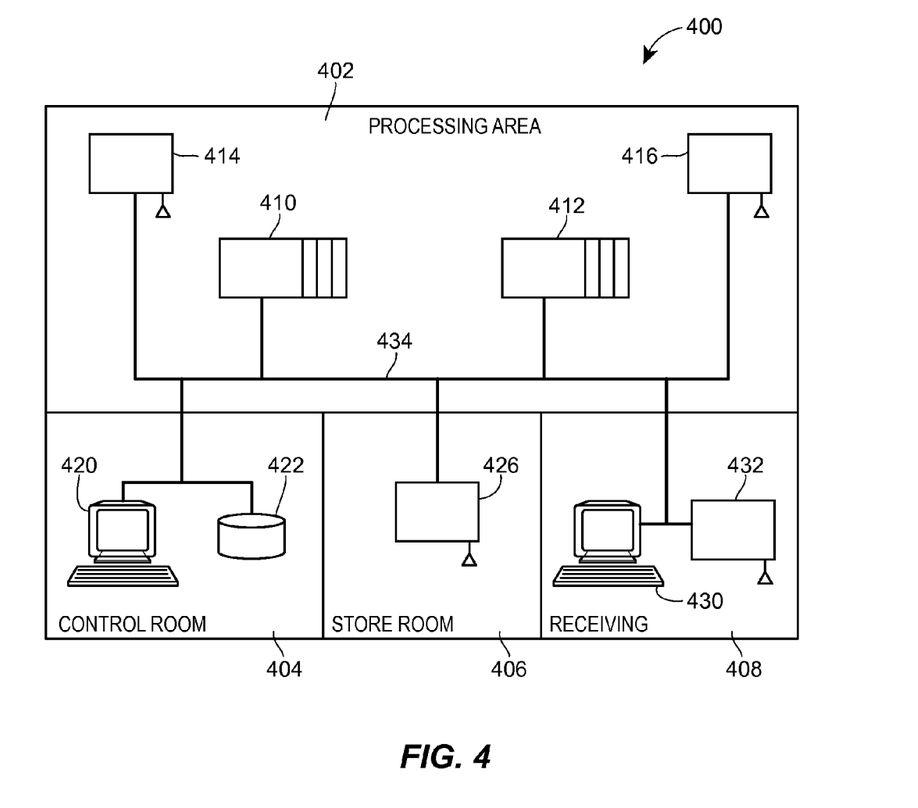
FIG. 4 is a block diagram showing a sample layout of a process plant environment.

FIG. 4 shows the general layout of a process plant 400 employing an embodiment of a field device inventory control system. The process plant 400 includes a processing area 402, a control room 404, a store room or warehouse 406 and a receiving area 408. The processing plant 400 includes a process control system for controlling one or more processes implemented in the processing area. The process control system may include a plurality of controllers 410, 412 housed in control closets or control panels located throughout the processing area 402. The controllers 410, 412 communicate with various field devices in the processing area either directly, over a communication bus, or wirelessly, as has been described. The processing area 402 may include one or more wireless gateways 414, 416 as part of a wireless field network adapted to communicate with one or more wireless enabled field devices implemented in the processing area 402. A computer workstation 420 and a database 422 may be located in the control room 404. A number of process related applications such as a configuration application, a maintenance application, an alarm management application and so forth, may be stored on and executed by the workstation 420. The database 422 may store configuration data for the process control system, historical operating data, and/or other process related data, as well as Instrument Specification Sheets for the field devices installed in the processing area 402.

The store room 406 may be provided for storing spare process control related equipment such as spare field devices and the like. A wireless gateway 426 may be included in the storeroom 406 in order to communicate with wireless enable field devices stored in the storeroom 406.

Another computer workstation 430 may be located in the receiving area 408. The workstation 430 may execute an inventory control application. The receiving area 408 may also include a wireless gateway 432 for communicating with wireless enabled field devices as they are received in the receiving area 408. A communication bus 434 extends throughout the processing plant 400, allowing the various components of the process control system (e.g., the controllers 410, 412, the wireless gateways 414, 416, 426, 432 the computer workstations 420, 430, database 422, etc.) to communicate and exchange data with one another. The process plant layout shown in FIG. 4 is illustrative only. Actual processing plant layouts may vary significantly from that shown in FIG. 4. Processing plants may, for example, have much more complex process control systems including different components and extending over much wider geographical area than that shown in FIG. 4. Various portions of the processing plant such as the processing area, 402 control room 404, store room 426 and receiving area 408 may be located remotely from the processing area 402 or simply in other parts of the processing pant. Furthermore, various parts of the processing plant 400 may be combined with other parts, or may be omitted altogether.

As mentioned above, the computer workstation 430 located if the receiving area 408 may be adapted to execute a field device inventory control application. Among the responsibilities of the field device inventory control application is to ensure that received field devices meet design specifications. As described in the background section of the present disclosure, this process typically required a manual or semi-manual inspection of each individual field device as the field devices were received. The wireless gateway 432 located in the receiving area 408 allows this process to be automated for wireless enabled field devices. In this case, newly received wireless enabled field devices can communicate wirelessly with the field device inventory control application as soon as they are within transmitting range of the gateway 432 or any other node of the self organizing wireless network implemented at the process plant 400.

According to an embodiment of a field device inventory control system, the parameters and physical characteristics of a wireless enable field device are stored in the field device's internal memory by the device supplier. When the wireless enabled field device is received at the processing plant 400 and the wireless enabled field device is brought within transmitting range of the wireless gateway 432, the wireless enabled field device can be made to transmit the parameter data and other characteristics of the device to the wireless gateway 432. The wireless Gateway 432 in turn may communicate the wireless enabled field device information to the computer workstation 430 executing the inventory control application. The inventory control application identifies the field device and accesses the database 422 to retrieve the Instrument Specification Sheet corresponding to the received wireless enabled field device. The inventory control application then compares the parameters received from the device against those specified in the Instrument Specification Sheet. At this point any discrepancies between the specified device and the received device may be identified and, if possible, corrected. Otherwise, the device may simply be rejected if the discrepancies between the specified device parameters and the received device parameters cannot be reconciled. For example, the inventory control application may be adapted to make simple software or parameter changes to the received process control field device in order to reconcile the field device with the specifications. If the discrepancy relates to a physical attribute of the field device, such as the materials of construction or some other physical characteristic of the field device, however, it may not be possible for the inventory control application to reconcile the received device to the specifications. In this case, the received field device must be rejected.

Figure 5:
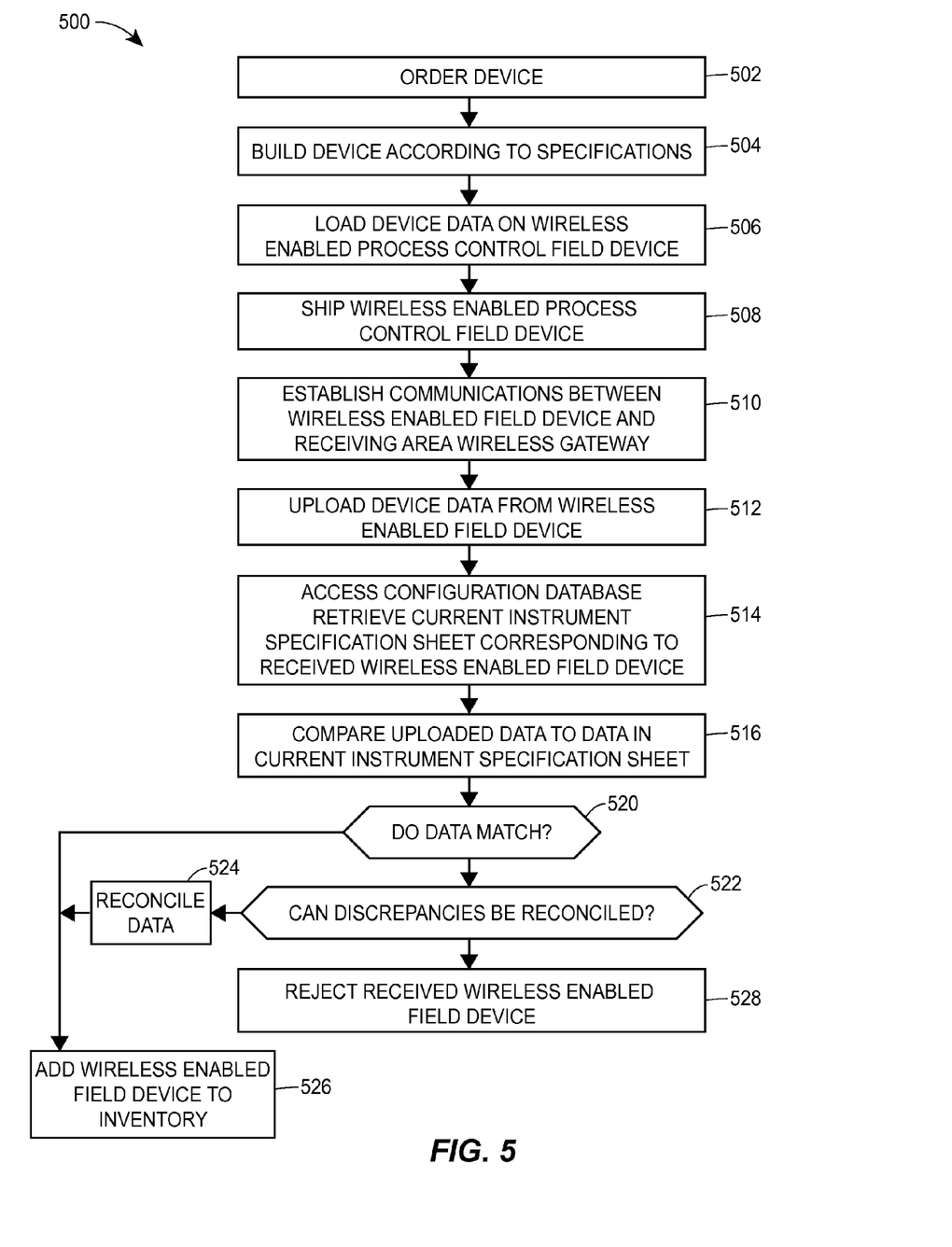
FIG. 5 is a flow chart illustrating a method of managing an inventory of wireless enabled process control field devices or other equipment in a process plant environment.

FIG. 5 is flow chart illustrating a method 500 of receiving and inspecting a wireless enabled field device to ensure the received wireless enabled field device meets the specified requirements of the process control system into which it is to be installed. The method begins when the field device is ordered 502. Upon receiving the order, the supplier configures the device according to the specifications 504. As part of the process of configuring the device, the supplier loads a number of parameters into the device's memory 506. These include a device tag identifying the device and at least a subset of the parameters and physical characteristics of the field device included in the device's instrument specification sheet. When the wireless enabled field device is configured, the supplier ships the device to the processing plant 508.

The wireless enabled field device is received at the process plant at 510. This step may comprise physically receiving the field device in the receiving area 408 (FIG. 4) or otherwise bringing the wireless enabled field devices within transmitting range of the receiving area gateway 432. Next, communications are established between the wireless enabled field device and the wireless gateway 432. To establish communication the wireless enabled field device sends an introductory signal to the receiving area wireless gateway 432 announcing its presence at the processing plant. This step may require physically activating the received process control field device so that, upon activation, the wireless enabled field device begins periodically transmitting the introductory signal to any wireless network nodes that happened to be within range of the wireless enabled field device's the wireless transmitter. The wireless enabled field device will continue periodically transmitting the introductory signal until it receives a response from the receiving area gateway 432 (or some other node in the processing plant's wireless network) indicating that its presence has been recognized and that communications between the processing plant's wireless network in the wireless enabled field device have been established.

Alternatively, the wireless enabled field device may be shipped in a semi-activated shipping mode in which the wireless enabled field device periodically transmits the introductory signal from the moment it ships. In this case, the wireless enabled field device establishes communication with the receiving area gateway 432, or some other node of the processing plant's wireless network, as soon as it is brought into transmitting range of the receiving area gateway 432, or the other node of the processing plant's wireless network. Once the receiving area gateway 432 responds to the wireless enabled field device, the wireless enabled field device may "wake up" and enter a more active mode of operation. This alternative shipping mode has the advantage of allowing received wireless enabled field devices to be recognized by and begin communicating with various applications implemented within the processing plant over the wireless communication network 434 automatically without the intervention of processing plant personnel; however, it requires sufficient battery power to allow the device to continue transmitting throughout the shipping process.

In either case, once communications between the wireless enabled field device and the wireless network 432 have been established, the inventory control application executed on the receiving area workstation 430 reads the device data stored in the received wireless enabled field device memory via the receiving area gateway 432 as shown at 512. Again, the device data stored in the wireless enabled field device memory and communicated to the inventory control application includes at least a subset of the data included in the device's Instrument Specification Sheet. The data transmitted from the received wireless enabled field device includes the device tag identifying the particular device and its intended function within the processing plant 400. At step 514 the inventory control application accesses the configuration database 422 via the communication bus 434 and retrieves the Instrument Specification Sheet corresponding to the received wireless enabled field device. At step 516 the inventory control application compares the device data received from the received wireless enabled field device to the data stored in the corresponding Instrument Specification Sheet. At decision block 520 the inventory control application determines whether the device data received from the received wireless enabled field device matches that stored in the device's Instrument Specification Sheet. If so, the received wireless enabled field device may be added to the device inventory at 526 and placed in storage until it is needed to replace a failed or failing field device already installed in the controlled process.

If at step 520, however, the data received from the received wireless enabled field device are found not to match the data stored in the device's Instrument Specification Sheet, a determination whether the discrepancies may be reconciled is made at step 522. If so, the discrepancies are reconciled at step 524 and the received wireless enabled field device is added to the device inventory at step 526. If the discrepancies cannot be reconciled, however, the device is rejected at 528. Rejected devices may be returned to the supplier for reconfiguration and/or restocking, or may be otherwise reassigned or repurposed to serve as replacements to some other field device in the processing plant having the same parameters and characteristics as the rejected wireless enabled field device.

Determining whether discrepancies between the device data stored in the received wireless enabled field device memory and the data found in the device's Instrument Specification Sheet can be reconciled will generally depend on the nature of the discrepancies. For example, soft parameters such as sensing ranges, units, or other parameters or operating characteristics that may be altered by merely changing a value stored in the wireless enabled field device's memory, may be easily reconciled at the process plant by rewriting the correct parameter values into the received wireless enabled field device's internal memory. Physical discrepancies, on the other hand, may be more difficult to reconcile. For example, if the materials that a particular wireless enabled field device is made of no longer match the materials of construction called for in the device's Instrument Specification Sheet, the discrepancy cannot be reconciled by merely changing the value of a "materials of construction" parameter in the wireless enabled field device's memory. Rather, a field device made from the proper materials must be provided. Thus, hard discrepancies, discrepancies in the physical construction or configuration of the wireless enabled field device, generally will not be capable of being reconciled at the process plant.

Therefore, if it is determined at step 522 that the discrepancies between the data received from the received wireless enabled field device are soft parameter type discrepancies, the inventory control application may be adapted to overwrite the incorrect parameter values stored in the received wireless enabled field device's memory with updated values taken from the device's Instrument Specification Sheet.

Among the advantages of the inventory control system described herein is that incoming process control field devices received from suppliers may be inspected to ensure that they meet specified requirements of the controlled process with little or no intervention by process plant personnel. Furthermore, since the inventory control application has access to the process control configuration database, process plant personnel can be assured that the inspection of incoming process control field devices takes place with the most up-to-date parameter values specified for the various process control field devices. Another advantage is that discrepancies between the various parameters included in a device's Instrument Specification Sheet and the parameter values stored in the device's memory when the device is shipped can be tracked, and the burden of correcting discrepancies may be allocated to the party at fault for creating the discrepancy. For example, if a device's Instrument Specification Sheet is altered during the time interval between when a replacement device is ordered and the time when the device is received at the process plant, the process plant which is responsible for the changed criteria could be held responsible for the costs associated with shipping the field device back to the supplier and any restocking charges associated with returning the field device to the supplier's inventory. On the other hand, if it can be shown that the device data of the received wireless enabled field device do not match the criteria specified in the order for the wireless enabled field device, then the supplier could be held accountable for replacing the wireless enabled field device with another device that meets the specified requirements.

Another advantage of the inventory control system disclosed herein is that the status of wireless enabled field devices on hand at the process plant may be continually monitored and automatically updated without input from plant personnel. For example, after a wireless enabled field device has been added to the inventory of on-hand field devices and placed in storage, the inventory control application may record the device's location within the storage area 406, and record the device's status as awaiting installation. Furthermore, when the device is removed from the storage area 406, the inventory control system may note that the gateway 426 located in the storage area 406 is no longer able to communicate with the wireless enabled field device, indicating that the wireless enabled field device has been removed from storage. Similarly, when the wireless enabled field device is installed in the controlled process, it may begin communicating with one of the gateways 414, 416 located in the processing area of the process plant. This information may be provided to the inventory control application, which may change the status of the wireless enabled field device from being held in storage to being installed in the field. Thus, a complete record of the wireless enabled field device's service can be generated automatically with substantially no intervention by process plant personnel. What is more, when the field device is removed from storage and installed in the field, the inventory control application may automatically generate an order for a replacement field device to replenish the inventory of backup field devices.

The present invention has been described with reference to specific examples. These examples are intended to be illustrative only and should not be read as limiting the invention in any way. It will be apparent to those of ordinary skill in the art that changes, additions or deletions may be made to the disclosed embodiments without departing from the spirit and scope of the invention.

The invention claimed is:

1. An inventory control system for use in processing plant environment, the inventory control system comprising:
   a computer workstation;
   a database storing instrument specification data for one or more process control devices used for controlling a process performed in the process plant environment;
   a wireless gateway adapted to wirelessly communicate with wireless enabled process control devices in the process plant environment;
   a communication bus interconnecting the wireless gateway, the computer workstation, and the database; and
   an inventory control application executed by the computer workstation, the inventory control application adapted to interrogate a received process control device via the wireless gateway to receive device data from the received process control device identifying and describing the received process control device, access the database to retrieve instrument specification data for the received process control device, and compare the received device data to the retrieved instrument specification data to ensure that the received process control device corresponds to the instrument specification data.

2. The inventory control system of claim 1 wherein the inventory control application is further adapted to log the received process control device into an inventory of received process control devices when the received device data match the instrument specification data.

3. The inventory control system of claim 1 wherein the inventory control application is further adapted to perform a reconciliation procedure when the received device data do not match the instrument specification data.

4. The inventory control system of claim 3 wherein the reconciliation procedure comprises rewriting one or more parameter values stored in the received process control device to match a corresponding value in the instrument specification data.

5. The inventory control system of claim 3 wherein the reconciliation procedure comprises instructing processing plant personnel to physically reconfigure the received process control device to match a physical configuration specified in the instrument specification data.

6. The inventory control system of claim 3 wherein the reconciliation procedure comprises rejecting the received process control device when a discrepancy between the device data and the instrument specification data cannot be corrected at the processing plant.

7. The inventory control system of claim 1 wherein the inventory control application is further adapted to monitor a status of the received process control device after the received process control device has been logged into an inventory of received process control devices.

8. The inventory control system of claim 7 wherein monitoring the status of the received process control device comprises periodically wirelessly determining a location of the process control device to determine whether the process control device is located in a storage area awaiting installation, or whether the process control device has been installed in a processing area of the process plant environment.

9. A method of inspecting wireless enabled process control equipment comprising:
   receiving a wireless enabled process control device having device data stored therein, the device data identifying the device and describing one or more characteristics of the device;
   wirelessly receiving the device data from the wireless enabled process control device,
   accessing a database to retrieve specification data corresponding the received wireless enabled process control device;
   comparing the specification data to the device data; and
   performing a reconciliation procedure when the specification data do not match the specification data.

10. The method of claim 9 further comprising logging the received wireless enabled process control device into an inventory of process control devices when the specification data match the device data.

11. The method of claim 10 further comprising monitoring the status of the received wireless enabled process control device after the wireless enabled process control device has been logged into the inventory of process control devices.

12. The method of claim 11 wherein the step of monitoring the status of the received wireless enabled process control device comprises periodically wirelessly determining a location of the wireless enabled process control device to determine whether the wireless enabled process control device is located in a storage area of the process plant awaiting installation in the controlled process, or whether the wireless enabled process control device has been installed in a processing area of the processing plant.

13. The method of claim 9 further comprising rewriting one or more parameter values stored in the received wireless enabled process control device to match a corresponding value in the specification data.

14. The method of claim 9 further comprising instructing processing plant personnel to physically reconfigure the received wireless enabled process control device to match a physical configuration specified in the specification data.

15. The method of claim 9 further comprising rejecting the received process control device when a discrepancy between the device data and the specification data cannot be corrected.

16. A computer readable medium on which computer instructions are stored which, when executed by a computer processor, provide an inventory control system for use in a process plant environment, the inventory control system adapted to perform the steps of:
   receiving a wireless communication from a received process control device, the wireless communication identifying the process control device and one or more operating parameters or physical characteristics of the process control device;
   retrieving specification data for the process control device from a database;
   comparing the one or more operating parameters or physical characteristics of the process control device to the specification data; and
   performing one of adding the process control device to an inventory of process control devices when the one or more operating parameters or physical characteristics of the process control device match the specification data, or reconciling the process control device with the specification data if the one or more operating parameters or physical characteristics of the process control device do not match the specification data.

17. The inventory control system of claim 16 wherein reconciling the process control device with the specification data comprises rewriting one or more parameter values stored in the received process control device to match a corresponding value in the instrument specification data.

18. The computer readable medium of claim 16 wherein reconciling the process control device with the specification data comprises instructing processing plant personnel to physically reconfigure the received process control device to match a physical configuration specified in the instrument specification data.

19. The computer readable medium of claim 16 wherein reconciling the process control device with the specification data comprises rejecting the received process control device when a discrepancy between the device data and the instrument specification data cannot be corrected at the processing plant.

20. The computer readable medium of claim 16 wherein the inventory control system is further adapted to perform the step of monitoring the status of the received wireless enabled process control device after the wireless enabled process control device has been logged into the inventory of process control devices.

21. The method of claim 20 wherein the step of monitoring the status of the received wireless enabled process control device comprises periodically wirelessly determining a location of the wireless enabled process control device to determine whether the wireless enabled process control device is located in a storage area of the process plant awaiting installation in the controlled process, or whether the wireless enabled process device has been installed in a processing area of the processing plant.

\* \* \* \* \*